Feb. 12, 1952         E. E. LAKSO         2,585,558
ARTICLE COUNTING AND FILLING

Filed Dec. 5, 1946         3 Sheets-Sheet 1

INVENTOR.
E. E. Lakso
BY Charles R. Fay,
Attorney

Feb. 12, 1952     E. E. LAKSO     2,585,558
ARTICLE COUNTING AND FILLING
Filed Dec. 5, 1946     3 Sheets-Sheet 2

INVENTOR.
E. E. Lakso
BY
Charles R. Fay
ATTORNEY

Feb. 12, 1952     E. E. LAKSO     2,585,558
ARTICLE COUNTING AND FILLING
Filed Dec. 5, 1946     3 Sheets-Sheet 3
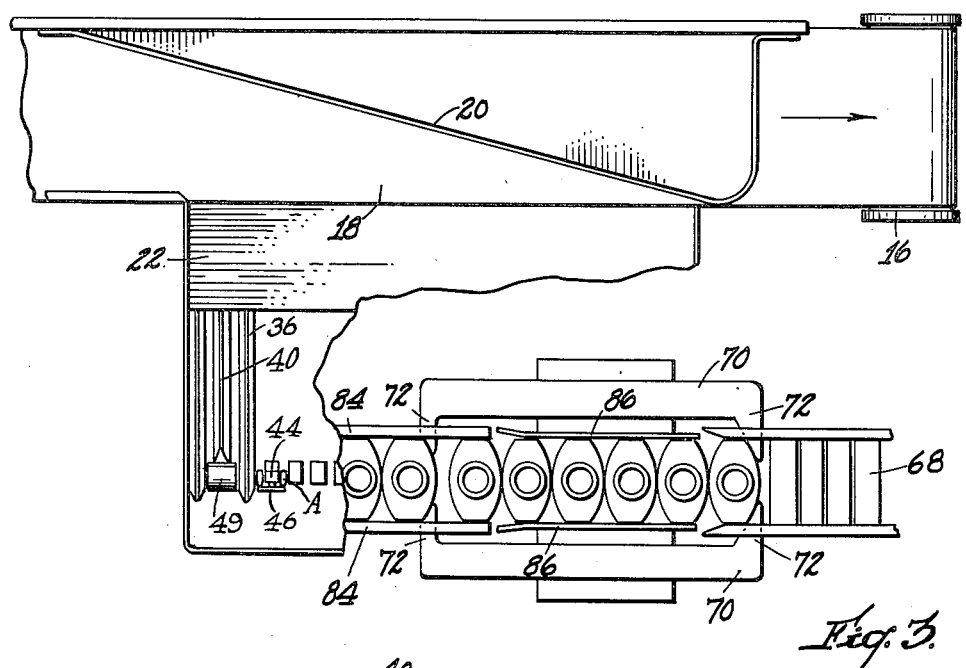
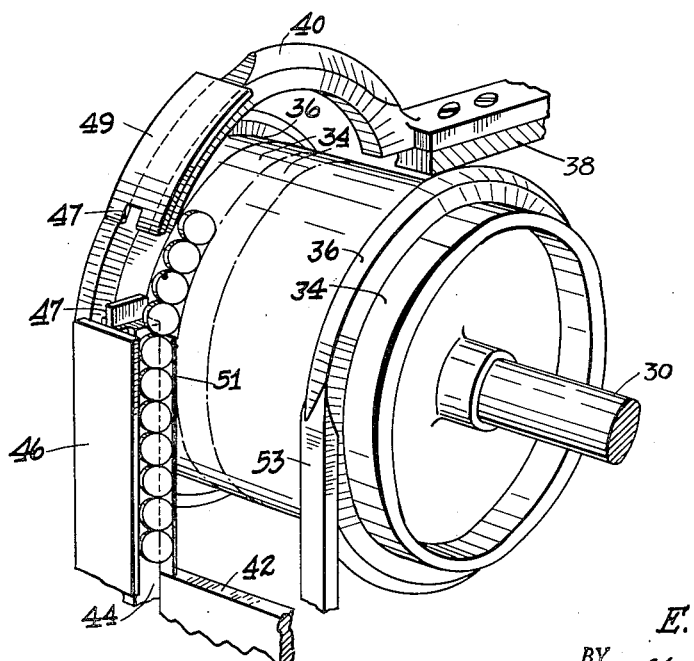
INVENTOR.
E. E. Lakso
BY Charles R. Fay,
Attorney Patented Feb. 12, 1952

2,585,558

UNITED STATES PATENT OFFICE 2,585,558

ARTICLE COUNTING AND FILLING

Eino E. Lakso, Fitchburg, Mass.

Application December 5, 1946, Serial No. 714,236

11 Claims. (Cl. 198—30)

This invention relates to feeding, alining, counting, delivering, and packaging articles such as tablets, pills, capsules, nuts, and any other small articles of similar nature.

The principal object of the invention is to provide an automatic machine for filling containers with accurately counted and undamaged articles at a rapid rate from a mass of articles as, for instance, delivered from a hopper or traveled on a belt.

Further objects of the invention reside in the provision of an automatic machine comprising means for delivering a continuous and constant flow of articles, means to aline the articles in a plurality of chutes in edge to edge contacting relation, the last named means including a mechanism comprising alternate fixed and rotatable fingers upon which the articles fall and between which the articles are alined, the articles then proceeding to a plurality of chutes in which the articles are counted by automatic means and in single file the articles are then deposited automatically in containers traveled in line one after the other in a direction transverse to the individual chutes and parallel to a bank of chutes.

Still further objects of the invention reside in the provision of an apparatus as above described including vibrating means to shake the containers to settle the contents thereof and new and improved stopping arrangement so as to position bottles accurately under the chutes in combination with means moving containers from chute to chute so each chute deposits a certain fraction of the total contents of each container and as the line of containers moves, one container or in multiples, issue from the machine in filled condition while new containers enter the machine completely empty giving a continuous automatic action so that the containers issue from the machine singly or in multiples in filled condition.

Other objects and advantages of the invention will appear hereinafter.

Reference is to be had to the accompanying drawings in which

Fig. 3 is a top plan view with parts omitted for the sake of clarity; and

Fig. 4 is a perspective exploded detail view of a part of the device.

Reference is hereby made to my co-pending application S. N. 641,561; filed January 16, 1946, and now abandoned, disclosing a machine having in general similar objectss of the invention, the present case, however, representing a considerable improvement over the aforementioned co-pending case.

Figure 1:
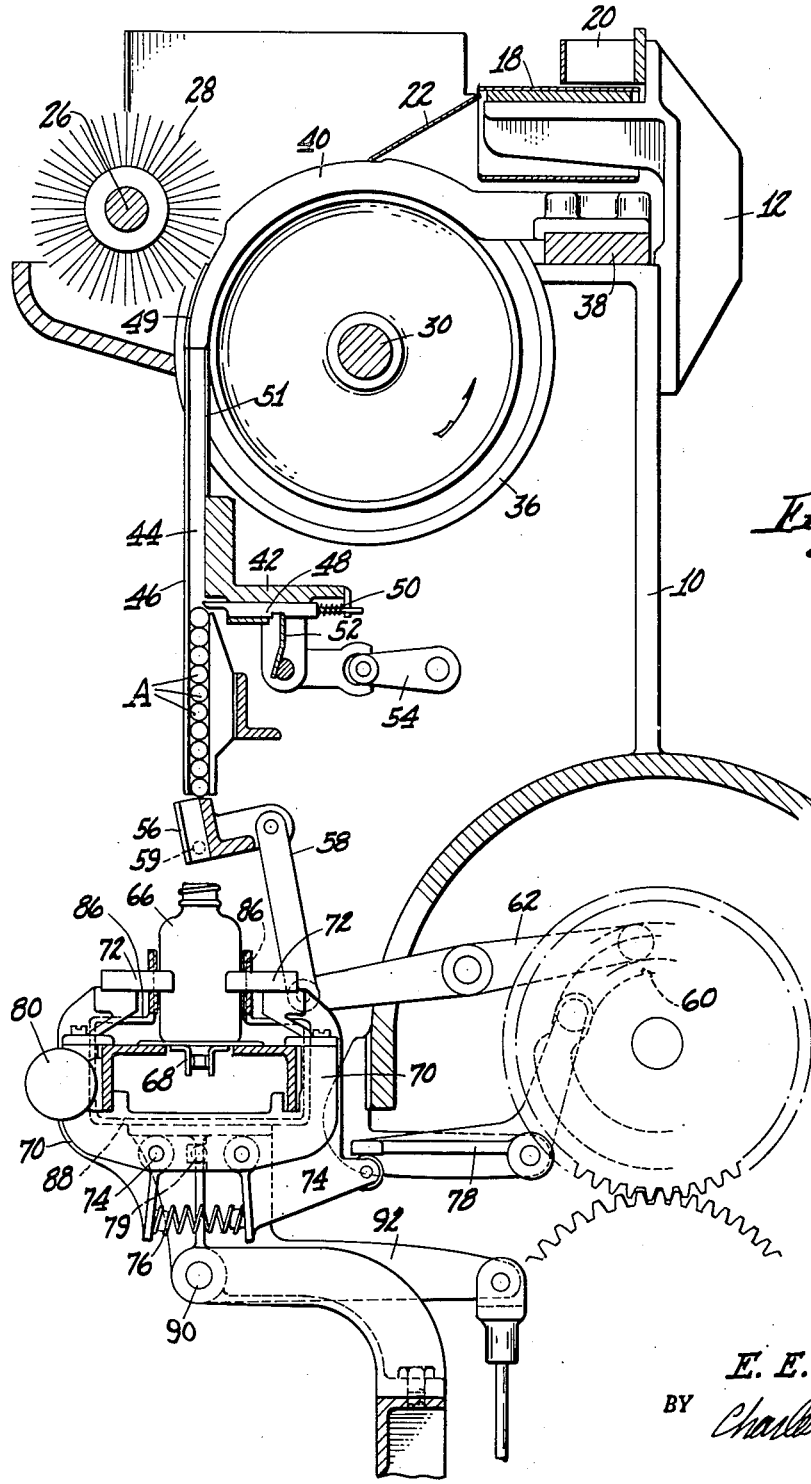
Fig. 1 is a view in side elevation of a machine embodying the invention, parts being in section.
Figure 2:
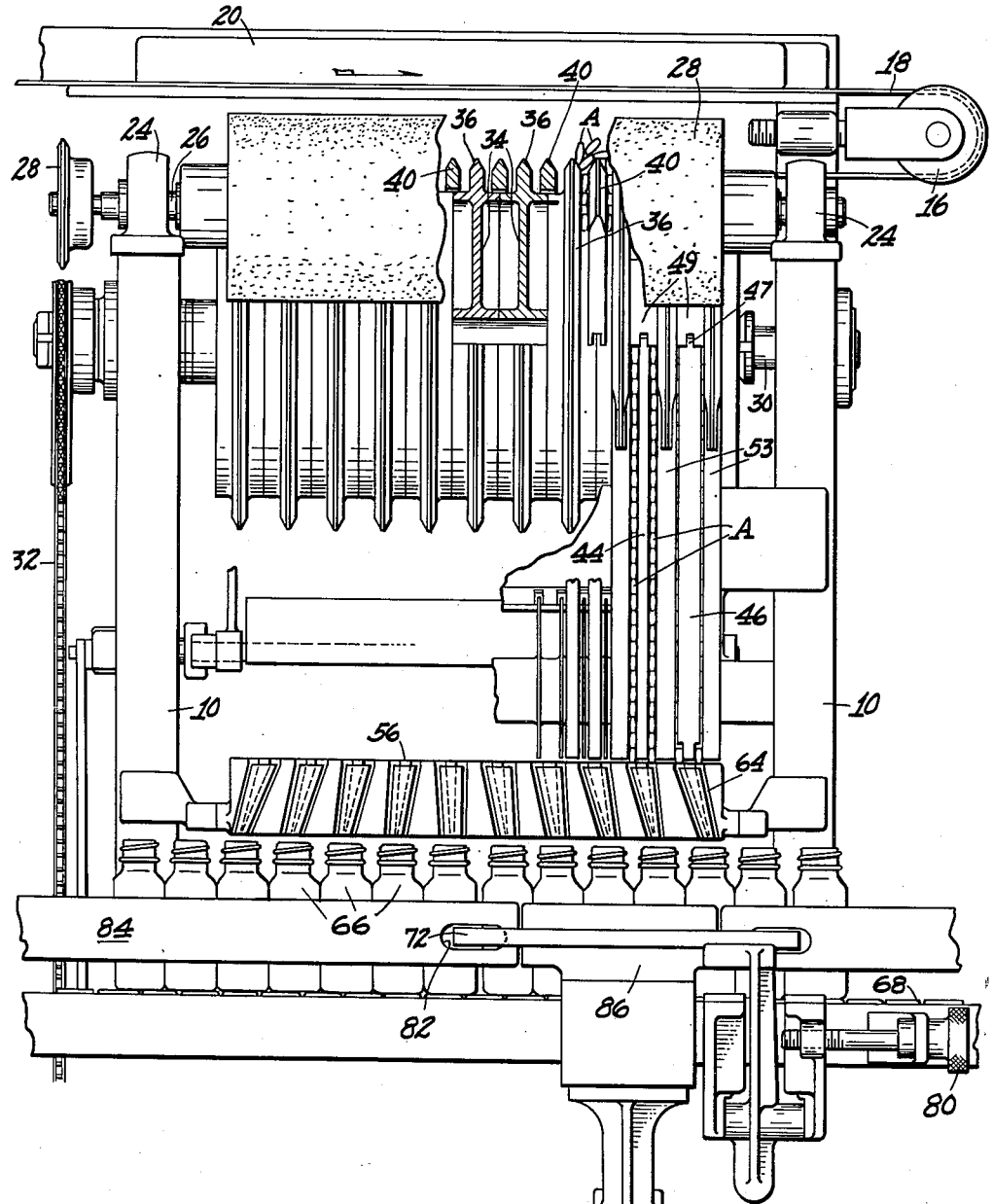
Fig. 2 is a view in front elevation of the machine of Fig. 1, parts being in section, and parts being broken away.

With reference to Figs. 1 and 2, the present invention comprises a frame work 10 which may be mounted on a table or base frame not shown. This framework is provided with a bracket 12 at the upper portion thereof which supports a roll or rolls 16 carrying a conveyor belt 18 in the direction of the arrow in Figs. 2 and 3. The articles to be counted and filled progress along this belt being supplied to the belt as, for instance, from a hopper such as disclosed in my co-pending application S. N. 541,792; filed June 23, 1944, and now Patent No. 2,449,395 granted September 14, 1948. Arranged just above the top run of belt 18 there is provided an angular fence 20, see particularly Fig. 3, this fence crowding the articles in a direction toward a downwardly inclined apron 22 down which the pills fall in substantially equal amounts from end to end of the apron, this steady flow of articles in uniform amount being due to the angularity of fence 20.

The framework 10 supports at spaced points pillow blocks or bearings 24 rotatably mounting a shaft 26 on which is mounted a brush 28, shaft 26 being driven as, for instance, by a pulley or the like 28. Framework 10 also rotatably supports a shaft 30 which may be driven by a sprocket chain 32, it being noted that the brush 28 rotates counter-clockwisewise, as seen in Fig. 1, and shaft 30 rotates in the same direction. Shaft 30 has secured thereto a plurality of wheels 34 each of which is provided with a narrow, peripheral rib 36, these ribs, of course, rotating at the speed of shaft 30.

Mounted on a member 38 supported on the framework 10 there are a plurality of arcuate fingers or ribs 40 which are fixed and stationary and are made on an arc to closely fit the periphery of the wheels 34, fingers 40 being alternately arranged in spaced relation with the fingers or ribs 36 on the wheels, this arrangement being clearly shown in Figs. 2 and 4. It will thus be seen that ribs 36 rotate, and fingers or ribs 40 are stationarily mounted, and the pills falling down apron 22 fall upon the ribs 36 and 40. Since these fingers or ribs are bevelled in to a V-shape the articles gradually shake down on their edges between the fingers as is clearly illustrated.

The brush 28 agitates the articles and prevents them from piling up and spilling over so that any article which does not happen to fall down onto its edge will be thrown back by the brush as long as is necessary to finally cause such article to follow the others into edge to edge relation as above described.

It is to be particularly noted that the alternate fixed and rotating ribs 36 and 40 present alternate moving and stationary fingers so that the effect is similar to one in which the alternate fingers or ribs were rotating in opposite directions and it has been found that by making some of the ribs stationary and the others rotating in one direction the apparatus is considerably simplified and the alining effects are rendered in full.

The frame 10 also mounts a bracket or bar 42 upon which may be mounted a series of chute bars 44 down along which the articles A fall as by gravity. These chute bars are provided with face plates as at 46 to overlay the articles and prevent them from falling out to the left as seen Fig. 1, the plates 46, however, being spaced so that the operator can easily determine whether or not the chutes are full. Plates 46 have a tongue and groove aligning connection at 47 with curved plates 49 secured to the ends of ribs 40, and each plate 46 overlays two rows of articles A. Scraper blades 51 are secured to bracket 42 and extend into close scraping contact with the peripheries of wheels 34 between the ribs or fingers 36, 40, to form means taking the articles from the wheels, see Fig. 4. Each rib 36 is provided with a lateral channel-shaped article guide 53 having a V cut therein to closely follow the rib contour to form the chute sides in combination with bars 44, and it will be seen that each chute is four sided and is formed by a bar 44, plate 46, blade 51, and a leg of a channel-shaped guide 53.

The bar or bracket 42 also provides a guide for a spring pressed plunger 48, there being one of these plungers at each chute. Plungers 48 are pressed to the left in Fig. 1 as by means of a spring 50 and by means of a finger 52 the plungers are drawn to the right away from the articles A by means of a linkage 54 operating similarly to a like device in the first aforementioned of the co-pending applications. Further description of this finger is thought not to be necessary inasmuch as it is fully described in my co-pending case; however, the function of this finger is to come forwardly under resilient pressure of the spring at timed intervals to stop the articles above it from descending any lower and the purpose of this article-stopping device will be further described below.

At the bottom of the chute, I provide an oscillating bar 56 mounted to rock by means of a link 58 on a pin or pins 59, this link being in turn oscillated by a cam shown in dotted lines at 60 through the action of a lever 62. The bar 56 is provided with a series of pairs of converging chutes as most clearly seen in Fig. 2 at 64. Each pair of chutes is located to deposit two rows of articles in a single container 66 so that if ten articles are deposited on each chute at a time the result is that twenty articles are deposited at each operation through the agency of the double chutes in the bar 56. Bar 56 is actually a gate and as shown in Fig. 1 ten articles A are stopped by this gate between the latter and the fingers 48. Articles above the fingers 48 will be stopped thereby and as the gate 56 is oscillated to aline with chute 44 the ten articles shown in Fig. 1 will drop into container 66. It is to be understood, of course, that each time the gate oscillates a double row of articles descends into each of ten containers so that at each oscillation of gate 56 two hundred articles are deposited, twenty in each of ten containers 66. The angularity of chutes 64 as shown in Fig. 2 is due to the fact that the containers 66 may be of a width wider than necessary for the construction of all of the chutes in the machine and if necessary this gate may be replaced by one having chutes at different angles for thinner or narrower containers.

The containers 66 are progressed parallel to the bank of chutes 44 in step by step relation on a conveyor belt 68 and it will be seen that as each bottle issues from the right hand end of the machine as shown in Fig. 2, such bottle will be filled with two hundred pills if the bottles progress from station to station, i. e., chute to chute, as defined, or with one hundred pills if the bottles advance at each step two stations, skipping every other station and receiving twenty articles at each of five stations. In the latter case, the containers are advanced and ejected in pairs.

In order to stop and properly position the containers I provide a stopping device, see Fig. 3, which comprises a pair of bars 70 having arms 72 at the ends thereof. These arms are pivoted at 74, see Fig. 1, and are spring pressed apart by a spring 76 below the pivots so as to force the arms 72 inwardly toward each other to stop a desired number of bottles in two banks. The arms are separated in order to allow the bottles to advance by a bellcrank 78 operated by cam 60. The two arms 70 operate simultaneously to be withdrawn from each other due to a pin and slot connection as shown at 79, that is, there being a slot in one arm between the pivots 74 and a pin on the other arm so that as one arm is rocked away from the containers the other arm is similarly rocked in the opposite direction also from the containers, this operation being in timed relation to the rest of the device.

This stopping mechanism may be moved to the right or left in Fig. 2 by means of a thumb screw 80 to allow for manufacturing variation in thicknesses of containers and it will be seen from Fig. 2 that the arms 72 extend through slots 82 in guides 84 which confine the containers to an in-line progress.

I also provide an oscillating means for shaking the articles down in the containers. This means comprises a pair of plates 86 positioned as a continuation of guides 84 and connected to a base 88 which is pivotally mounted at 90 and is oscillated by a crank 92, see Fig. 1. This vibration is intended to be very rapid and of short stroke so that the contents of the containers are not damaged nor jostled to too great a degree, but are merely slightly vibrated in order to settle the same in the containers.

The conveyor 68 is continuous, and when the line of containers is stopped to receive the articles, the passing conveyor imparts a vibration to the containers not included between the stop arms 72, so that a preliminary shake-down occurs prior to the vibration by means 86.

The operation of the device will be clear from the above description taken in conjunction with the drawings, and the inventor will be seen to provide a relatively simplified device for aligning articles fed thereto in haphazard position, counting the aligned articles, and depositing the required amount in a row of passing containers, the action being completely automatic from start to finish.

Having thus described my invention and the advantages thereof, I do not wish to be limited to the details herein disclosed otherwise than as set forth in the claims, but what I claim is:

1. In a machine of the class described, a rotary shaft, a plurality of spaced peripheral ribs thereon, a plurality of spaced stationary ribs, the rotary and stationary ribs alternating in spaced relation, means to supply unaligned articles to the ribs, means to receive the aligned articles therefrom, the stationary ribs being arcuate and generally conforming to the peripheral ribs so that the ribs together present a series of arcuate grooves each having a fixed wall and a moving wall.

2. The machine of claim 1 wherein the article supplying means is constructed and arranged to be effective to flow said articles onto the ribs in the general direction of rotation of the shaft.

3. In a machine of the class described, a series of generally parallel arcuate spaced ribs, a second series of arcuate ribs alternating with the first series, the latter moving relatively to the second series, means to supply unaligned articles to the combined ribs, and means to receive aligned articles therefrom, the ribs presenting a series of arcuate grooves each of which has walls relatively oppositely moving.

4. In a machine of the class described, a series of parallel spaced ribs, every other rib being continuously movable in a direction along the lengths of the ribs so that all the ribs are relatively continuously movable as respects the next adjacent ribs at each side thereof, and article supplying means and article receiving means associated with the ribs, the said moving ribs being circular and the alternate remaining ribs being fixed and arcuate.

5. The machine of claim 4 wherein the said moving ribs are substantially circular and the alternate remaining ribs are fixed and arcuate to the degree of curvature of the circular ribs.

6. In a machine of the class described, a series of spaced rotatable rib-like elements, a series of fixed rib-like elements alternating therewith and spaced therefrom forming a series of grooves each of which has a moving wall and a fixed wall, and a chute for each groove in continuation thereof, said chutes each receiving a line of aligned articles from the grooves, and means supplying unaligned articles to the ribs and grooves.

7. The machine of claim 6 wherein the article supplying means flows the articles onto the ribs in the same general direction as the direction of rotation of the rotatable rib-like elements.

8. An article aligning device comprising a series of rotating wheels each having a peripheral plane surface, an outstanding circular rib on each wheel, a fixed rib conforming to said surface and overlying apart only thereof to provide an arcuate article aligning groove between each fixed and rotatable rib, the bottom of the groove being formed by the free portion of the said surface, and means receiving aligned articles from said grooves.

9. The device of claim 8 including a generally tangential surface scraping blade engaging said surface and forming a part of said aligned article receiving means.

10. An article aligning device comprising a series of spaced rotating ribs and an alternating series of fixed arcuate ribs, all the ribs being spaced to form article aligning grooves, and tangential means in extension of the arcuate ribs forming a wall of an article receiving chute for each groove.

11. The device of claim 10 including tangential means in extension of the rotating ribs and forming a wall of an article receiving chute for each groove.

EINO E. LAKSO.

REFERENCES CITED

The following references are of record in the file of this patent:

UNITED STATES PATENTS

| Number | Name | Date |
| --- | --- | --- |
| 1,437,409 | Evans | Dec. 5, 1922 |
| 1,710,074 | Saviano | Apr. 23, 1929 |
| 1,874,442 | Calloway | Aug. 30, 1932 |
| 1,931,114 | Olney | Oct. 17, 1933 |
| 2,109,391 | Lauck et al. | Feb. 22, 1938 |
| 2,333,576 | Aerr | Nov. 2, 1943 |
| 2,336,676 | Erikson et al. | Dec. 14, 1943 |
| 2,362,517 | Woodberry | Nov. 14, 1944 |